United States Patent [19]
Ashida et al.

[11] Patent Number: 5,933,796
[45] Date of Patent: Aug. 3, 1999

[54] DATA EXTRACTING SYSTEM BASED ON CHARACTERISTIC QUANTITIES OF DATA DISTRIBUTION

[75] Inventors: Hitoshi Ashida; Hideyuki Maki, both of Yokohama; Erika Ayukawa, Kawasaki; Akira Maeda, Yokohama; Yukiyasu Ito, Ebina, all of Japan

[73] Assignee: Hitachi, Ltd., Tokyo, Japan

[21] Appl. No.: 08/904,753

[22] Filed: Aug. 1, 1997

[30] Foreign Application Priority Data

Aug. 9, 1996 [JP] Japan ................................ 8-210828

[51] Int. Cl.⁶ .................................................. G06F 17/30
[52] U.S. Cl. ............................................. 702/181; 707/7
[58] Field of Search ................... 364/554; 395/603–606, 395/800; 702/180, 181, 187; 707/7, 100, 200

[56] References Cited

U.S. PATENT DOCUMENTS 5,710,915   1/1998   McElhiney et al. ................... 395/603

FOREIGN PATENT DOCUMENTS 7-271825   10/1995   Japan .

OTHER PUBLICATIONS

An Introduction to Database Systems, vol. I, Fourth Edition, Addison–Wesley Publishing Company, "Built–In Functions", pp. 136–139, 1986.

*Primary Examiner*—Kamini Shah
*Attorney, Agent, or Firm*—Fay, Sharpe, Beall, Fagan, Minnich & McKee

[57] ABSTRACT

In a data utilizing system, a statistic table exhibiting a characteristic distribution is automatically extracted from given statistic tables of data. After confirmation of distribution of the data on the extracted statistic table, data required is retrieved from the statistic table. The data utilizing system for extracting from data constituted by a set of records each composed of at least two item values each containing at least one numeric item value, a part of the records constituting a part of the data, includes: as statistic table list generating unit for generating from the data statistic tables of component data for which at least one item value is definitely specified, and for determining arithmetically characteristic quantities for the statistic tables, respectively, on the basis of differences between the statistic tables and relevant expected value distribution tables, to thereby generate a list of the statistic tables on the basis of the characteristic quantities; and a record list generating unit for generating from the data a list of records contained in all or at least one specified cell of a specified given one of the statistic tables.

8 Claims, 13 Drawing Sheets

FIG.1

107
CHARACTERISTIC RECORD LIST

106
RECORD LIST GENERATING METHOD SPECIFYING PARAMETERS

105
RECORD LIST GENERATING UNIT

104
STATISTIC TABLE LIST

103
STATISTIC TABLE LIST GENERATING METHOD SPECIFYING PARAMETERS

102
STATISTIC TABLE LIST GENERATING UNIT

101
RAW DATA

FIG.3

| Trans.No. | CUSTOMER ID | STORE ID | ... | PURCHASE PRICE |
|---|---|---|---|---|
| 000001 | 3768671 | 16 | ... | 5600 |
| 000002 | 765876 | 12 | ... | 12000 |
| 000003 | 765876 | 15 | ... | 22000 |

| ITEM USED | A, B, C, D, ... |
|---|---|
| STATISTIC VALUE | SUM |
| ITEM FOR A DISPLAY (ORDINATE) | A |
| ITEM FOR A DISPLAY (ABSCISSA) | B |
| CONDITIONS | $C=C_q, ...$ |
| NUMBER OF DISPLAYS | U |

$C = C_q, \ldots$

|  | $B_1$ | $\cdot \cdot B_j \cdot \cdot$ | $A_n$ | SUM |
|---|---|---|---|---|
| $A_1$ | $S_{11}$ | $\cdots$ | $S_{1n}$ | $\Sigma S_{1j}$ |
| $\vdots$ $A_i$ $\vdots$ | $\vdots$ | $S_{ij}$ | $\vdots$ | $\vdots$ |
| $A_m$ | $S_{m1}$ | $\cdots$ | $S_{mn}$ | $\Sigma S_{mj}$ |
| SUM | $\Sigma S_{i1}$ | $\cdots$ | $\Sigma S_{in}$ | $\Sigma\Sigma S_{ij}$ |

FIG.9

$C = C_q, \ldots, P = P_k$

|  | $B_1$ | $\cdot \cdot B_j \cdot \cdot$ | $B_n$ | SUM |
|---|---|---|---|---|
| $A_1$ | $t_{11}$ | $\cdots$ | $t_{1n}$ | $\Sigma t_{1j}$ |
| $\vdots$ $A_i$ $\vdots$ | $\vdots$ | $t_{ij}$ | $\vdots$ | $\vdots$ |
| $A_m$ | $t_{m1}$ | $\cdots$ | $t_{mn}$ | $\Sigma t_{mj}$ |
| SUM | $\Sigma t_{i1}$ | $\cdots$ | $\Sigma t_{in}$ | $\Sigma\Sigma t_{ij}$ |

FIG.10

$C = C_q, \ldots, P = P_k$

|  | $B_1$ | $\cdot \cdot B_j \cdot \cdot$ | $B_n$ | SUM |
|---|---|---|---|---|
| $A_1$ | $R(P_k) \cdot S_{11}$ | $\cdots$ | $R(P_k) \cdot S_{1n}$ | $R(P_k) \cdot \Sigma S_{ij}$ |
| $\vdots$ $A_i$ $\vdots$ | $\vdots$ | $R(P_k) \cdot S_{ij}$ | $\vdots$ | $\vdots$ |
| $A_m$ | $R(P_k) \cdot S_{m1}$ | $\cdots$ | $R(P_k) \cdot S_{mn}$ | $R(P_k) \cdot \Sigma S_{mj}$ |
| SUM | $R(P_k) \cdot \Sigma S_{i1}$ | $\cdots$ | $R(P_k) \cdot \Sigma S_{in}$ | $R(P_k) \cdot \Sigma\Sigma S_{ij}$ |

| CONDITION FOR STATISTIC TABLE | ARTICLE TYPE=CD-ROM |
|---|---|
| CONDITION FOR CELL | YEAR=95, OS=A |
| DATA TYPE | RDB |
| RECORD LIST ITEM NAME | NAME, ADDRESS |
| RECORD LIST ITEM NAME | 10 |

FIG.13

SELECT customers.cust_name, customers.cust_address
FROM sales, stores, items, periods, customers
WHERE sales.cust_id = customers.cust_id
AND sales.store_id = stores.store_id
AND sales.item_id = items.item_id
AND sales.sale_order_date = periods.day
AND periods.year_number = 1995
AND items.item_os = '   A   '
AND items.item_type = 'CD-ROM Drive'
GROUP BY customers.cust_id

FIG.14

| NAME | ADDRESS |
|---|---|
| N.Faldo | 200 Church St.. |
| M.Chan | 3101 Tasman.. |
| ⋮ | |

| ITEM USED | ARTICLE TYPE, INTERNAL/ EXTERNAL, OS CUSTOMERS, STORE TYPE, ADDRESS, DATE |
|---|---|
| STATISTIC VALUE | SUM |
| ITEM FOR A DISPLAY (ORDINATE) | OS |
| ITEM FOR A DISPLAY (ABSCISSA) | YEAR |
| CONDITIONS | NONE |
| NUMBER OF DISPLAYS | 10 |

FIG.17

WINDOW TABLE MINING SEARCH

NO CONDITION

|     | 1994    | 1995    | SUM     |
|-----|---------|---------|---------|
| A   | 609711  | 1079212 | 1688923 |
| B   | 508183  | 645868  | 1154051 |
| SUM | 1117894 | 1725080 | 2842974 |

FIG.18

| ITEM NAME | HIERARCHY | ITEM VALUE |
|-----------|-----------|------------|
| ADDRESS   | CITY      | San Diego  |
| ADDRESS   | CITY      | New York   |
| ADDRESS   | STATE     | CA         |
| ADDRESS   | STATE     | NY         |
| ITEM_TYPE | ITEM_TYPE | Hard Drive |
| ADDRESS   | STATE     | FL         |
| ADDRESS   | CITY      | Palmetto   |
| INT_EXT   | INT_EXT   | External   |
| LINE_NAME | LINE_NAME | Home Series|
| ADDRESS   | STATE     | MN         |

FIG.19

WINDOW TABLE MINING SEARCH

CITY = SanDiego

|     | 1994   | 1995   | SUM     |
|-----|--------|--------|---------|
| A   | 95582  | 567571 | 663153  |
| B   | 154891 | 234823 | 389714  |
| SUM | 250473 | 802394 | 1052867 |

FIG.20

| NAME    | ADDRESS        |
|---------|----------------|
| N.Faldo | 200 Church St..|
| M.Chan  | 3101 Tasman..  |
|         |                |
|         |                |
|         |                |

FIG.21

| ITEM USED | ARTICLE TYPE, INTERNAL/ EXTERNAL, OS CUSTOMERS, STORE TYPE, ADDRESS, DATE |
|---|---|
| STATISTIC VALUE | SUM |
| ITEM FOR A DISPLAY (ORDINATE) | OS |
| ITEM FOR A DISPLAY (ABSCISSA) | YEAR |
| CONDITIONS | CITY = San Diego |
| NUMBER OF DISPLAYS | 10 |

FIG.22

WINDOW TABLE MINING SEARCH

NO CONDITION

|     | 1994    | 1995    | SUM     |
|-----|---------|---------|---------|
| A   | 609711  | 1079212 | 1688923 |
| B   | 508183  | 645868  | 1154051 |
| SUM | 1117894 | 1725080 | 2842974 |

LIST

DATA EXTRACTING SYSTEM BASED ON CHARACTERISTIC QUANTITIES OF DATA DISTRIBUTION

BACKGROUND OF THE INVENTION

The present invention relates to a data utilizing system for arithmetically determining or computing characteristic quantities of statistic tables of data for extracting data contained in a cell or cells specified or designated by a user with the aid of the computed characteristic quantities.

Techniques capable of generating statistic tables of data include three conventional techniques mentioned below.

(1) Utilization of Statistic Software

"MICROSOFT EXCEL FOR WINDOWS 95 STEP BY STEP" (Microsoft Press, 1995) can be mentioned in which techniques capable of generating statistic tables concerning all items of data are described (Related Art 1).

(2) Utilization of Relational Database

"BUILT-IN FUNCTIONS" described in "AN INTRODUCTION TO DATABASE SYSTEMS" (Addison-Wesley Publishing Company 1986), pp. 136–139 may be mentioned as the related technique in which a relational database is used (Related Art 2). By utilizing the relational database, statistic tables can be generated from a large amount of data. Besides, search or retrieval of data can easily be executed.

(3) Utilization of Multidimensional Database

In recent years, the multidimensional database is attracting attention as a database dedicated for analyses. In the multidimensional database, results previously obtained for all items are collected. Thus, the result as desired can be outputted to be instantaneously available. However, such results are independent from the original data (JP-A-7-271825: Related Art 3). Some products concerning the multidimensional database are now on the market.

SUMMARY OF THE INVENTION

As is apparent from the above, there are known techniques for generating statistic tables. It is however noted that the individual statistic tables cannot be evaluated by resorting to any one of the conventional techniques.

In the light of the state of the art described above, it is a first object of the present invention to provide a data utilizing system which is capable of automatically extracting a statistic table exhibiting a characteristic distribution.

It is certainly possible to search or retrieve the records concerned by making use of the related art 1 and 2 mentioned above. However, it is impossible to search or retrieve straightforwardly the records from the statistic tables of data with any one of the conventional techniques known heretofore.

Accordingly, it is a second object of the present invention to provide a data utilizing system which is capable of extracting straightforwardly records contained in the extracted table or record(s) contained in a cell or cells constituting a part or parts of the statistic table.

In view of the first mentioned object, there is provided according to a first aspect of the invention a data utilizing system in which a plurality of statistic tables are generated on the basis of raw data by a statistic table list generating unit, whereon the statistic tables are evaluated to thereby extract automatically the statistic table exhibiting a characteristic distribution.

Furthermore, in view of the second mentioned object, there is provided according to another aspect of the invention a data utilizing system in which a record contained in a specified or designated cell of a statistic table selected from a statistic table list generated by a record list generating unit is automatically extracted from raw data.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views.

Figure 1:
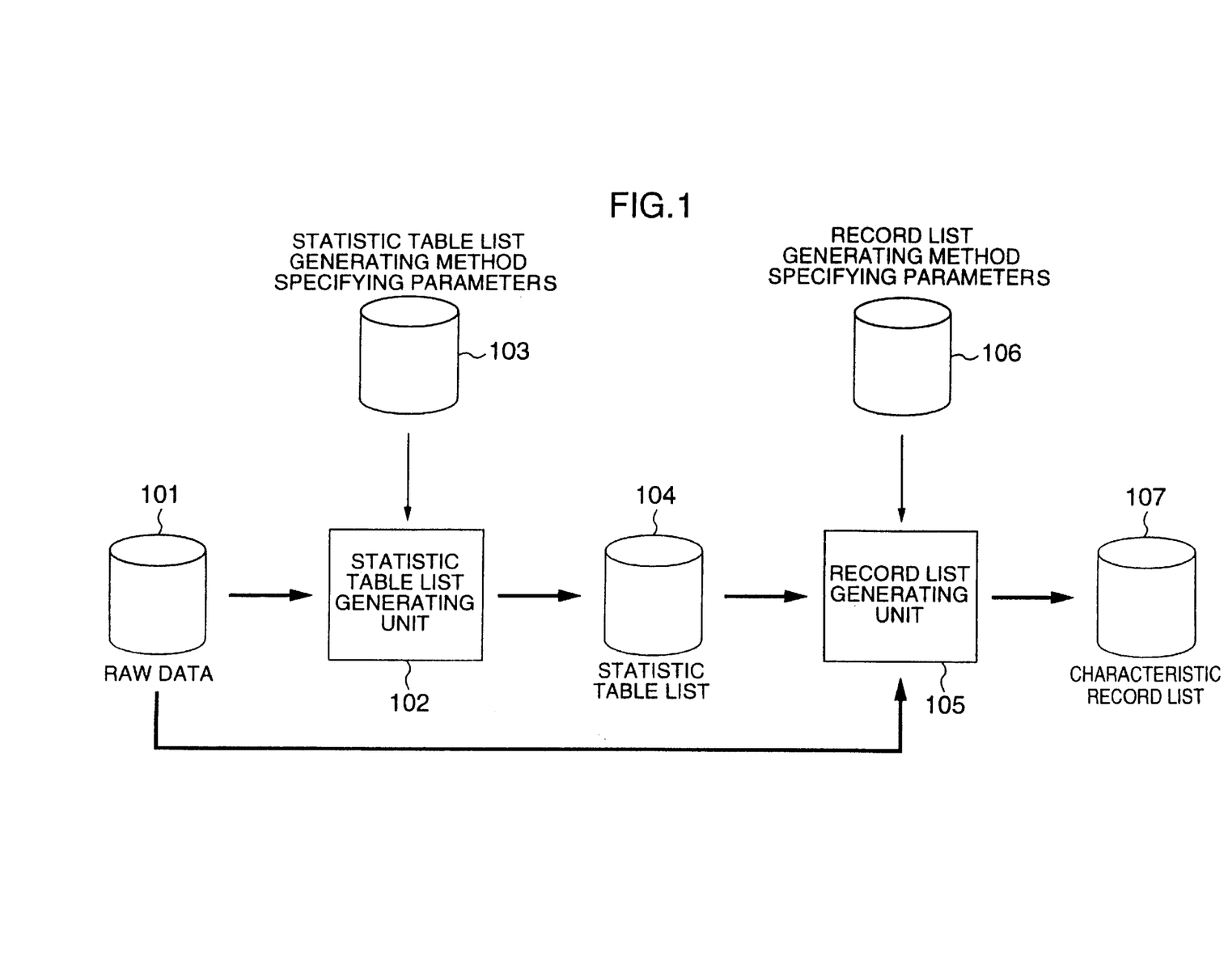
FIG. 1 is a schematic diagram showing a general arrangement of a data utilizing system according to an embodiment of the present invention.

FIG. 1 is a schematic diagram showing a general arrangement of a data utilizing system according to an embodiment of the present invention. The data utilizing system is so designed as to create or generate a statistic table list on the basis of raw data of concern and then create or generate a characteristic record list therefor.

Referring to FIG. 1, reference numeral 102 denotes a statistic table list generating unit which is designed to generate as an output thereof a statistic table list 104 on the basis of raw data 101 composed of a set of records each including at least two item values, each of which in turn contains one or more numeric item values, and statistic table list generating method specifying parameters 103 for specifying or designating parameters involved in the generation of the statistic table list. Further, in FIG. 1, reference numeral 105 denotes a record list generating unit, which is supplied with the statistic table list 104 and record list generating method specifying parameters 106 for designating a cell or the like in the statistic table as inputted upon generation of the record list, and which outputs a characteristic record list 107 contained in the cell designated by the parameters.

Figure 3:
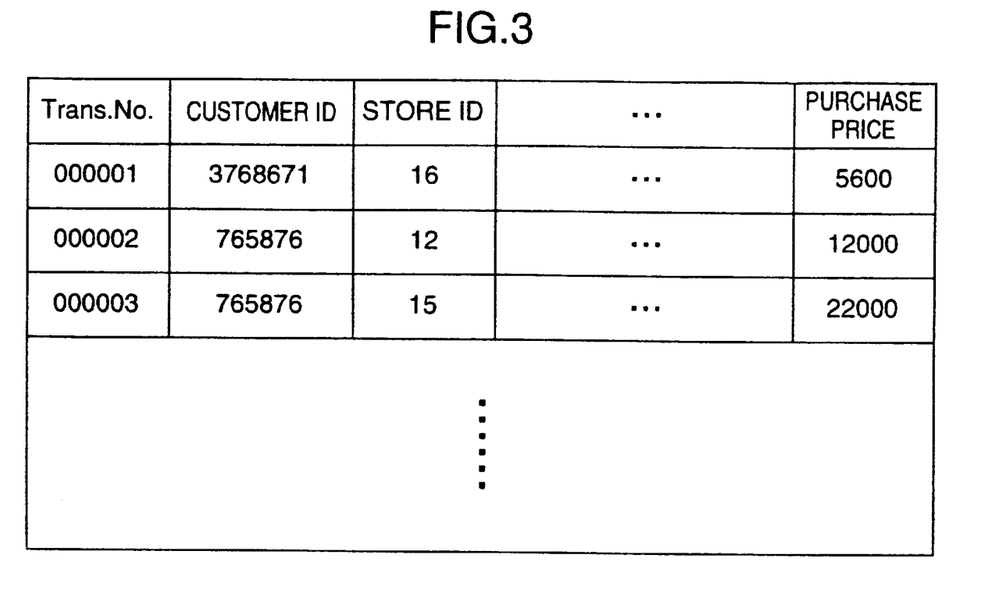
FIG. 3 is a view for illustrating, by way of example, concerned raw data destined for analysis and search in the system according to the invention.
Figure 4:
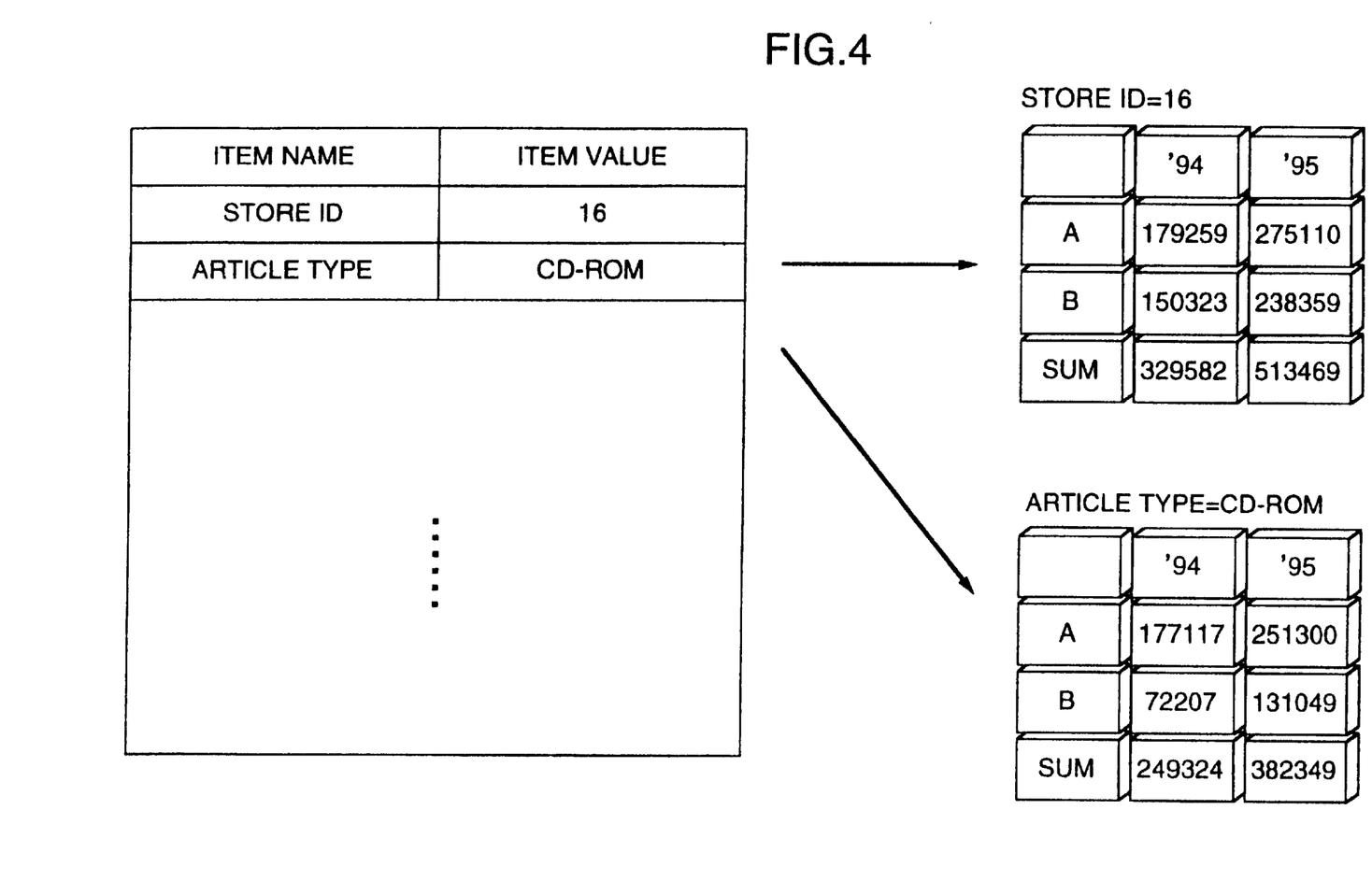
FIG. 4 is a view showing, by way of example, a statistic table list and statistic tables generated in the system according to the invention.

The units shown in FIG. 1 will individually be described in detail. At first, description is directed to the statistic table list generating unit 102. An example of the raw data inputted to the statistic table list generating unit 102 is illustrated in FIG. 3. In this conjunction, it is to be noted that although the data illustrated is of a spreadsheet type, the invention is never restricted to such a specific format. By way of example, the raw data may be of a relational database. The statistic table list contains combinations of item names and item values, as illustrated in FIG. 4, only by way of example. Each item value indicates a condition to be newly added in correspondence to the statistic table, as is shown in FIG. 4.

Figure 2:
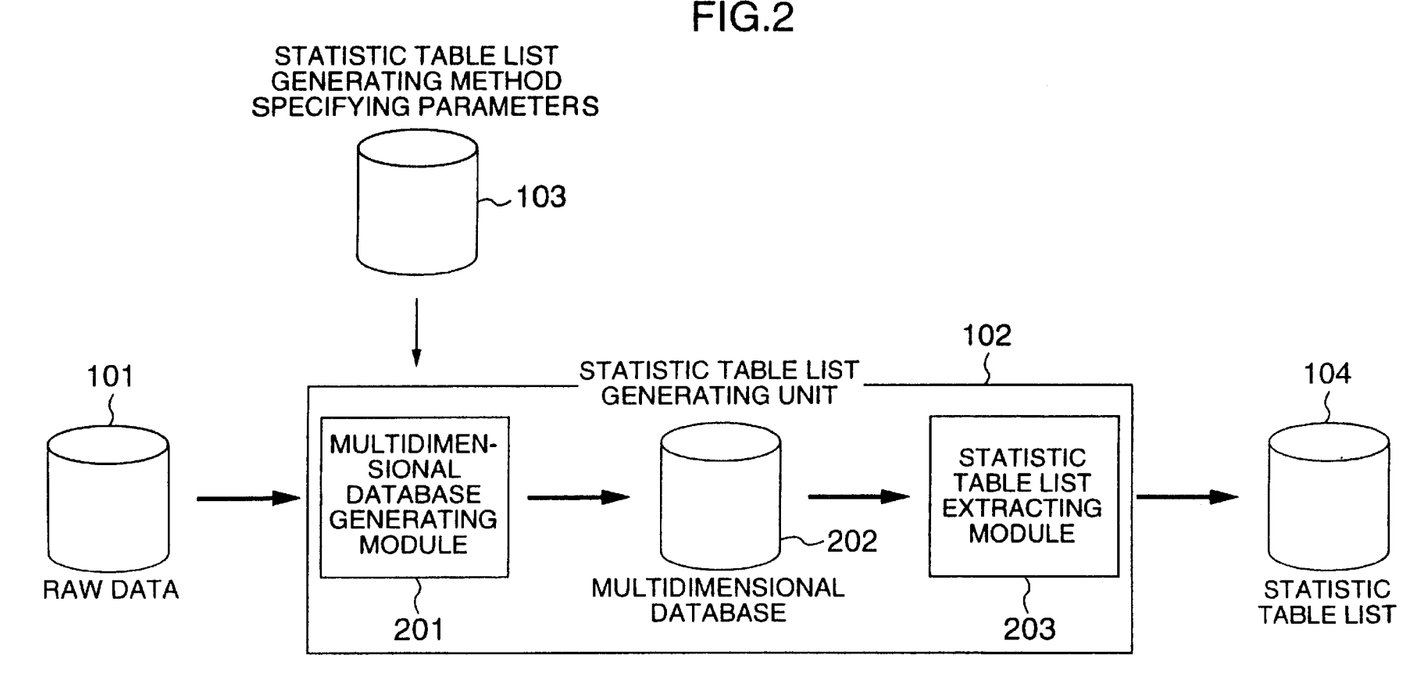
FIG. 2 is a schematic diagram showing a configuration of a statistic table list generating unit according to the invention.

Referring to FIG. 2, the statistic table list generating unit 102 is comprised of a multidimensional database generating module 201 and a statistic table list extracting module 203.

Supplied to the multidimensional database generating module 201 as the inputs thereto are the raw data 101 and the statistic table list generating method specifying parameters 103, whereby a multidimensional database 202 is outputted from the multidimensional database generating module 201.

The statistic table list generating method specifying parameters 103 designate the items to be used in the multidimensional database, statistic values to be indicated in the statistic table, items of the statistic tables to be displayed, and the number of the statistic table lists to be displayed on a display screen of a computer.

Figure 5:
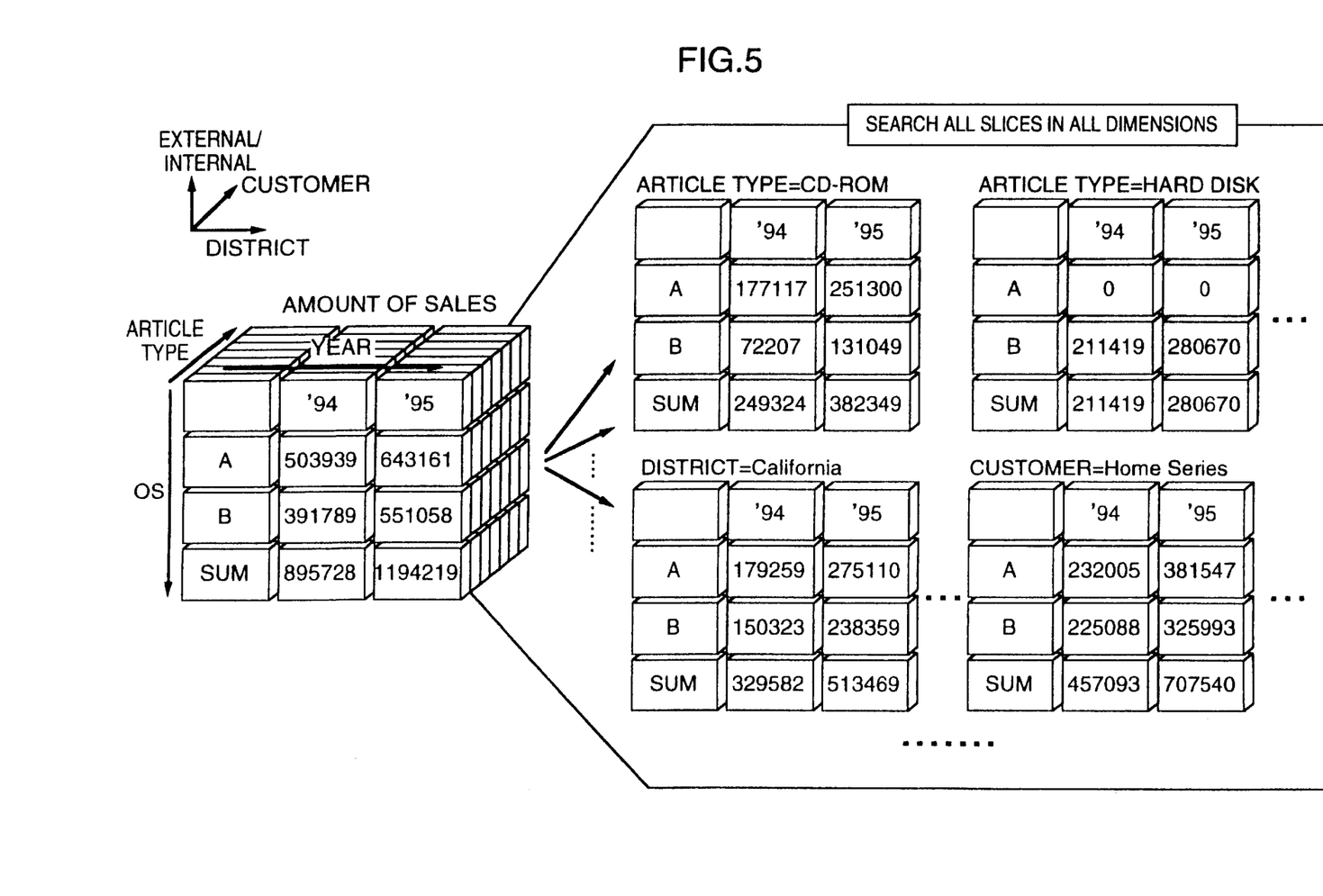
FIG. 5 is a conceptual diagram illustrating an example of a multidimensional database generated and utilized in the system according to the invention.

The multidimensional database 202 may be of a conventional database. FIG. 5 shows an example of the multidimensional database 202. In the case of this example, three items concerning OS (operating system), year number and article type, respectively, are represented in a cubic form for diagrammatization. However, theoretically no limitation is imposed on the number of items. As can be seen in the figure, the multidimensional database is structured by a set containing a plurality of statistic tables. In the multidimensional database technology, the statistic table is referred to as a "slice".

Figure 6:
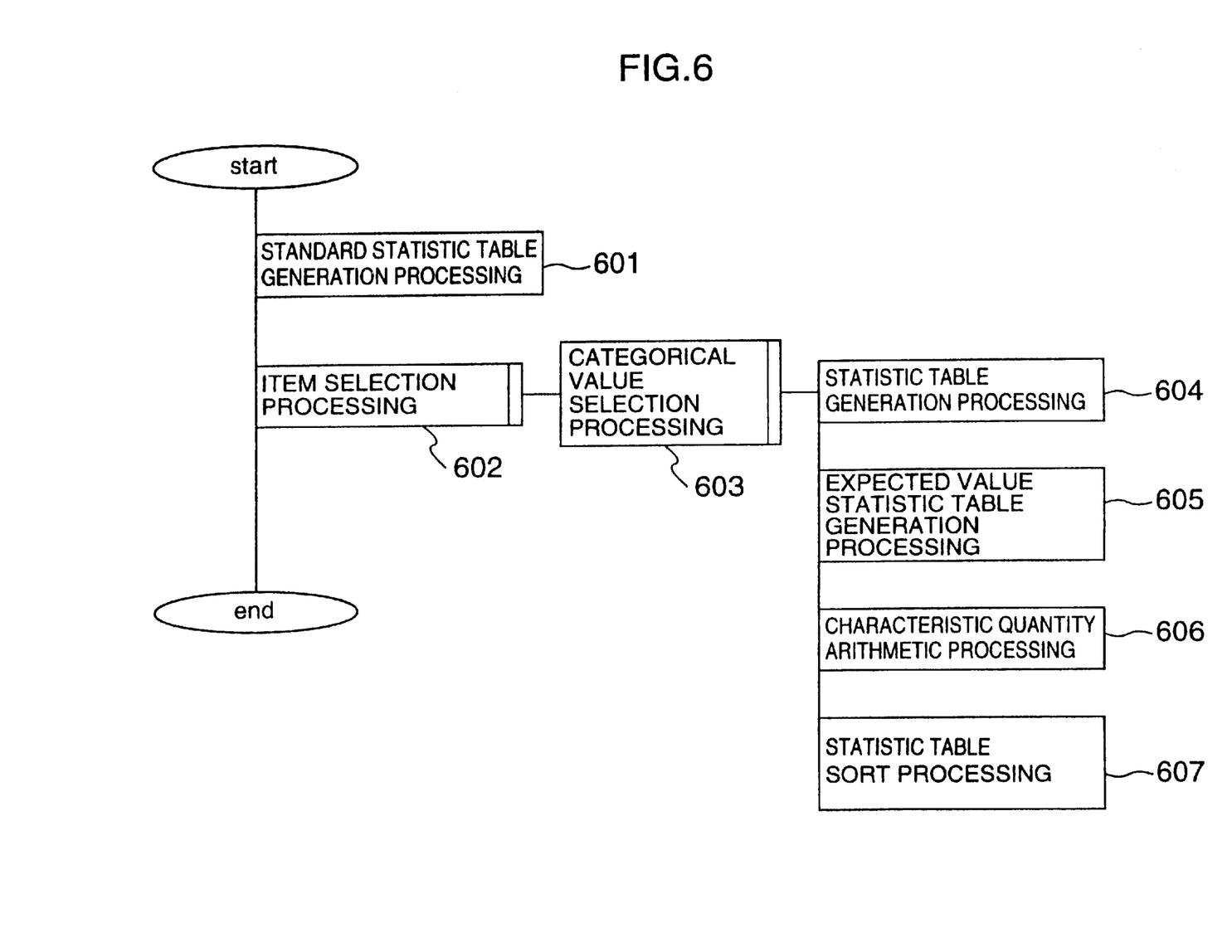
FIG. 6 is a PAD diagram for illustrating a statistic table list extraction processing executed in the system according to the invention.

The statistic table list extracting module 203 is so designed as to create or generate a variety of statistic tables from the multidimensional database 202 in accordance with the statistic table list generating method specifying parameters 103, and to arithmetically determine characteristic quantities on the basis of differences between the individual statistic tables and relevant expected value distribution tables, respectively, whereon the statistic lists are sorted in ascending order of the characteristic quantities. Thus, a number of the statistic table lists 104 corresponding to a total number of the statistic table list generating method specifying parameters 103 are outputted from the statistic table list extracting module 203. FIG. 6 is a problem analysis diagram (hereinafter referred to as a PAD diagram) for illustrating a statistic table list extraction processing procedure executed by the statistic table list extracting module 203.

Figure 8:
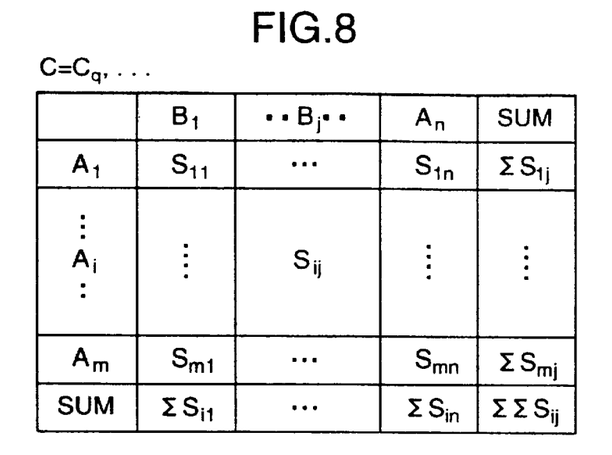
FIG. 8 is a view showing a standard statistic table generated through a statistic table list extract processing in the system according to the invention.

Referring to FIG. 6, the statistic table list extraction processing procedure includes a standard statistic table generation processing step 601 for generating a standard statistic table such as that shown in FIG. 8 in accordance with the statistic table list generating method specifying parameters 103, which table provides a standard or reference for the arithmetic determination or computation of the characteristic quantities, and an item selection processing step 602 for newly selecting a single given item for limiting the record, whereon succeeding processing steps 603 to 607 are repeated. More specifically, in the categorical value selection processing step 603, the single given item value selected in the item selection processing step 602 is selected as a categorical value, whereon processing steps succeeding to the processing step 604 inclusive thereof are executed repetitionally. In the statistic table generation processing step 604, the item value selected in the processing step 603 is added as a new condition for generating a statistic table. In the expected value statistic table generation processing step 605, a statistic table of expected values is generated in response to the new condition added in the processing step 604. In the characteristic quantity arithmetic processing step 606, any difference between the statistic table generated in the processing step 604 and the expected value statistic table generated in the processing step 605 is evaluated or determined. Finally, in the statistic table sort processing step 607, the statistic tables are sorted on the basis of the characteristic quantities arithmetically determined through the characteristic quantity arithmetic processing step 606.

Figure 7:
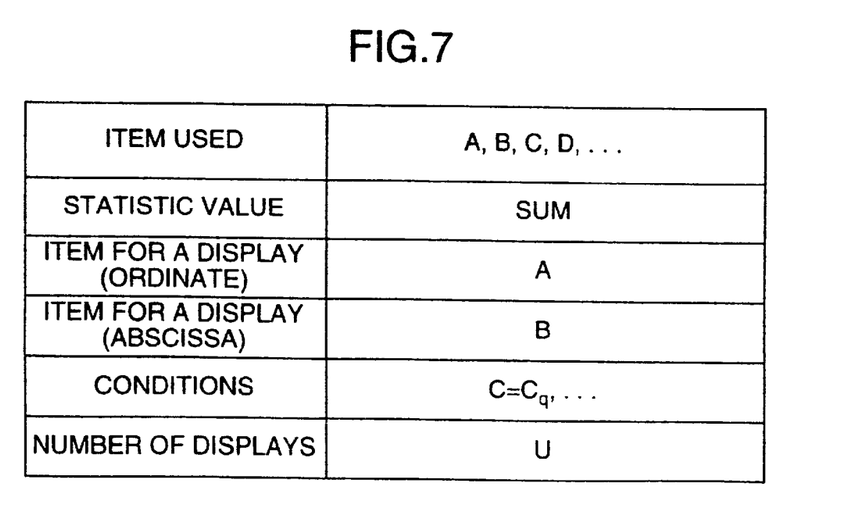
FIG. 7 is a view showing a statistic table list generating method specifying parameters used for activation of a statistic table list generating unit in the system according to the invention.

FIG. 7 shows examples of the statistic table list generating method specifying parameters 103. On the other hand, FIG. 8 shows an example of the standard statistic table generated through the standard statistic table generation processing step 601. In FIG. 8, "C=$C_q$, . . . ," shown at the left upper portion outside of the table, represents the condition, "$A_i$(i=

"1, ..., m)" represents the item values of an item A, "$B_j(j=1, ..., n)$" represents the item values of an item B, and "$S_{ij}(i=1, ..., m, j=1, ..., n)$" represents statistic values.

Figure 9:
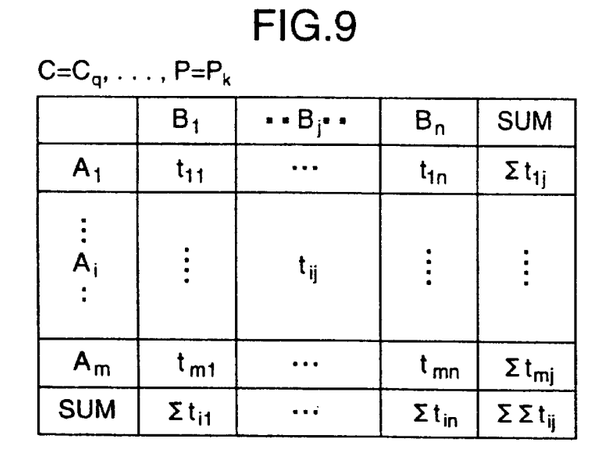
FIG. 9 is a view showing a real statistic table generated through the statistic table list extract processing in the system according to the invention.

In the case where an item P is selected in the item selection processing step 602 with an item value $P_k$ being selected through the categorical value selection processing step 603, the statistic table only for the records which satisfy the condition that $P=P_k$ is generated, as is illustrated in FIG. 9.

Next, description will be made of the expected value statistic table generation processing step 605. The sum total of the static values of the records contained in the standard statistic table shown in FIG. 8 is given by the following expression (Exp. 1):

$$\text{Sum Total of Record Value} = \sum_{i=1}^{m} \sum_{j=1}^{n} s_{ij} \qquad (\text{Exp. 1})$$

Now, the sum total of the records satisfying the condition that $P=P_k$ is represented by $\text{Sum}(P_k)$ with $R(P_k)$ being defined as follows:

$$R(P_k) = \frac{\text{Sum}(P_k)}{\sum_{i=1}^{m} \sum_{j=1}^{n} s_{ij}} \qquad (\text{Exp. 2})$$

Figure 10:
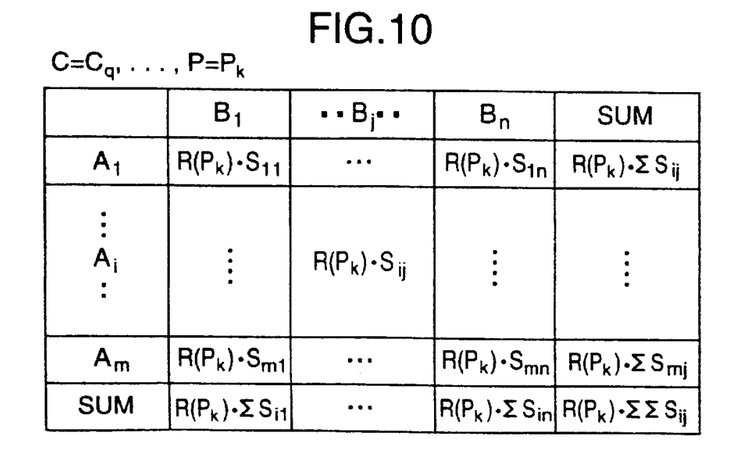
FIG. 10 is a view showing a distribution table of expected values as generated through the statistic table list extract processing in the system according to the invention.

In this case, there is generated the statistic table for the expected values, as shown in FIG. 10.

In the characteristic quantity arithmetic processing step 606, a sum total of squared values of the differences between the corresponding cell values in the actual statistic table and the expected value statistic table as standardized with square values of the expected values is determined, and represented by the following expression (Exp. 3):

$$\text{Characteristic Quantity} = \sum_{i=1}^{m} \sum_{j=1}^{n} \left( \frac{t_{ij} - R(P_k) \times S_{ij}}{R(P_k) \times S_{ij}} \right)^2 \qquad (\text{Exp. 3})$$

In the statistic table sort processing step 607, the statistic tables are sorted on the basis of the characteristic quantities calculated in the characteristic quantity arithmetic processing step 606. The statistic table list is represented by the sets of the item names and the item values, as previously shown in FIG. 4.

Figure 11:
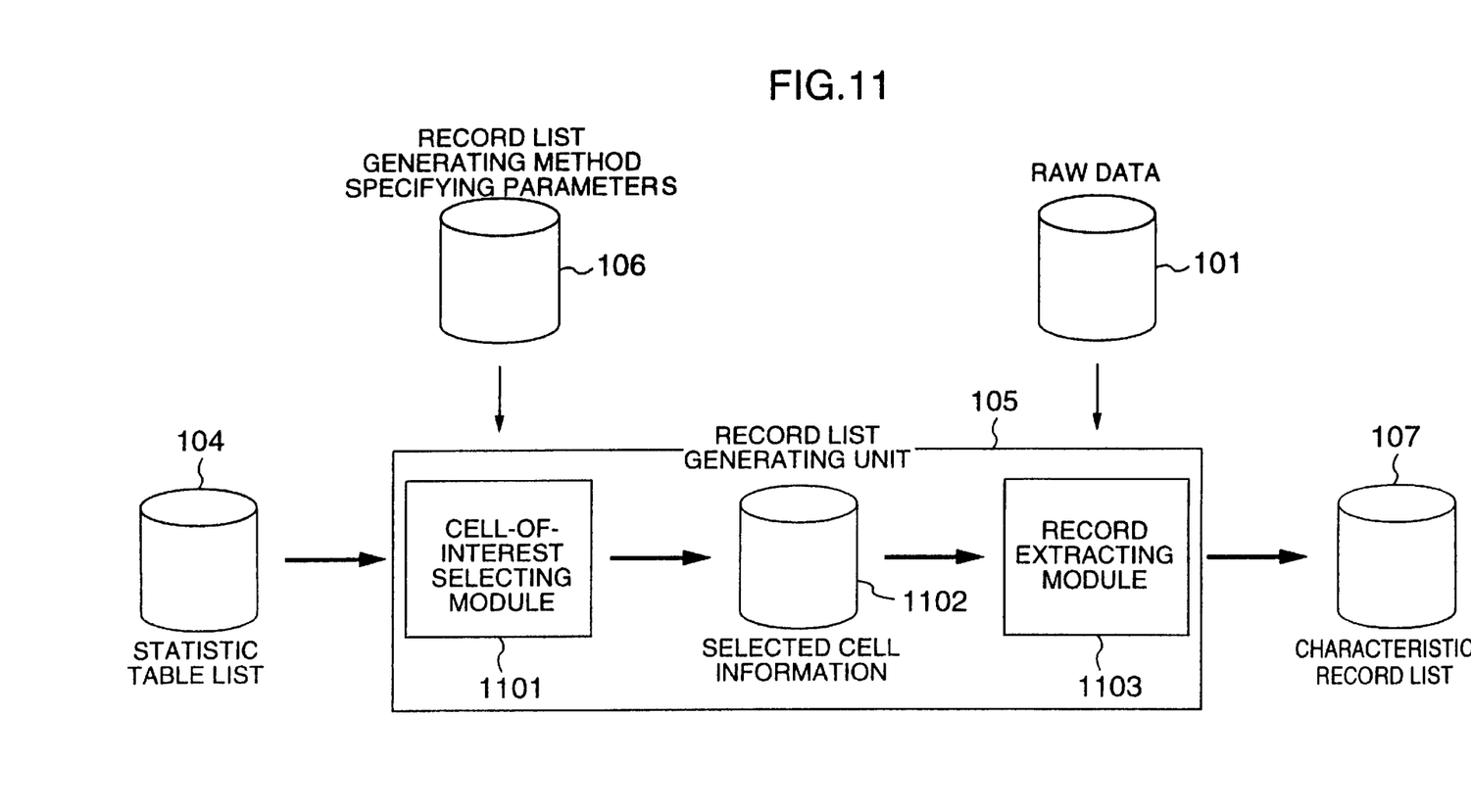
FIG. 11 is a schematic diagram showing a configuration of a record list generating unit in the system according to the invention.

Now, referring to FIG. 11, the record list generating unit 105 is comprised of a cell-of-interest selecting module 1101 and a record extracting module 1103. Supplied to the cell-of-interest selecting module 1101 as the inputs thereto are the statistic table list 104 and the record list generating method specifying parameters 106, whereby selected cell information 1102 is outputted from the cell-of-interest selecting module 1101.

The record extracting module 1103 is supplied as the inputs thereto with the selected cell information 1102 and the raw data 101, whereby a characteristic record list 107 is outputted from the record extracting module 1103.

Figure 12:
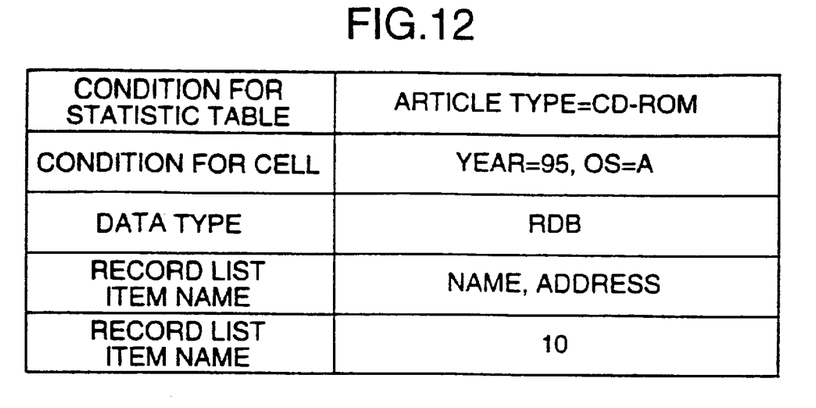
FIG. 12 is a view showing, by way of example, record list generating method specifying parameters used in the system according to the invention.

The record list generating method specifying parameters 106 include information concerning the statistic table and the cell to be selected, information concerning the storage scheme or type of the concerned raw data for retrieval, items of the record list and the number of records. The record list generating method specifying parameters 106 are stored in such a form, as shown in FIG. 12. More specifically, FIG. 12 shows examples of the record list generating method specifying parameters 106 on the assumption that the cells "year number=95" and "OS=A" are selected from the slice (statistic table) titled "ARTICLE TYPES=CD-ROM" (see FIG. 4).

Figure 13:
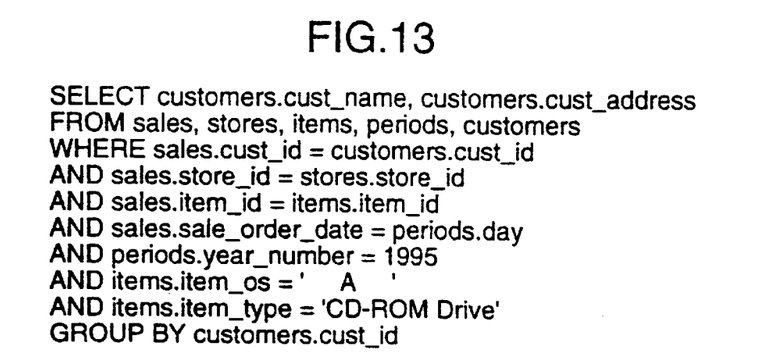
FIG. 13 is a view showing, by way of example, selected cell information used in the system according to the invention.

The cell-of-interest selecting module 1101 is designed to select from the statistic table list 104 the statistic table specified by the record list generating method specifying parameters 106, and then to select the cell specified or designated by the same parameters. Furthermore, the cell-of-interest selecting module 1101 transforms the selected cell into a query statement based on the data of the type designated by the record list generating method specifying parameters 106 to thereby output it as the selected cell information 1102. By way of example, in case the data is of a relational database (RDB), the selected cell information 1102 is transformed into an SQL (Structured Query Language) statement such as that illustrated in FIG. 13.

Figure 14:
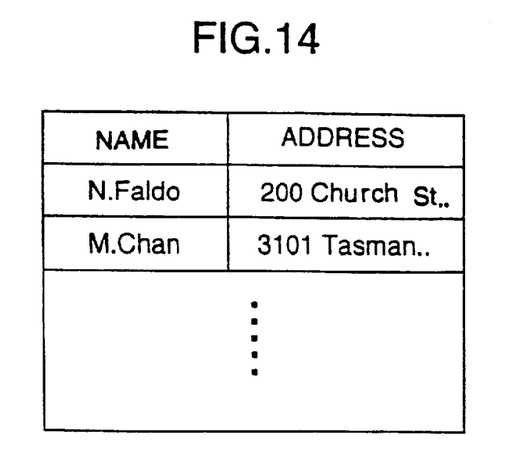
FIG. 14 is a view showing, by way of example, a record list generated in the system according to the invention.

The record extracting module 1103 searches the raw data on the basis of the selected cell information 1102 to thereby output the characteristic record list 107. In this conjunction, the characteristic record list 107 may be outputted in such a format as that shown in FIG. 14. An exemplary application of the data utilizing system described above will be elucidated below.

Figure 15:
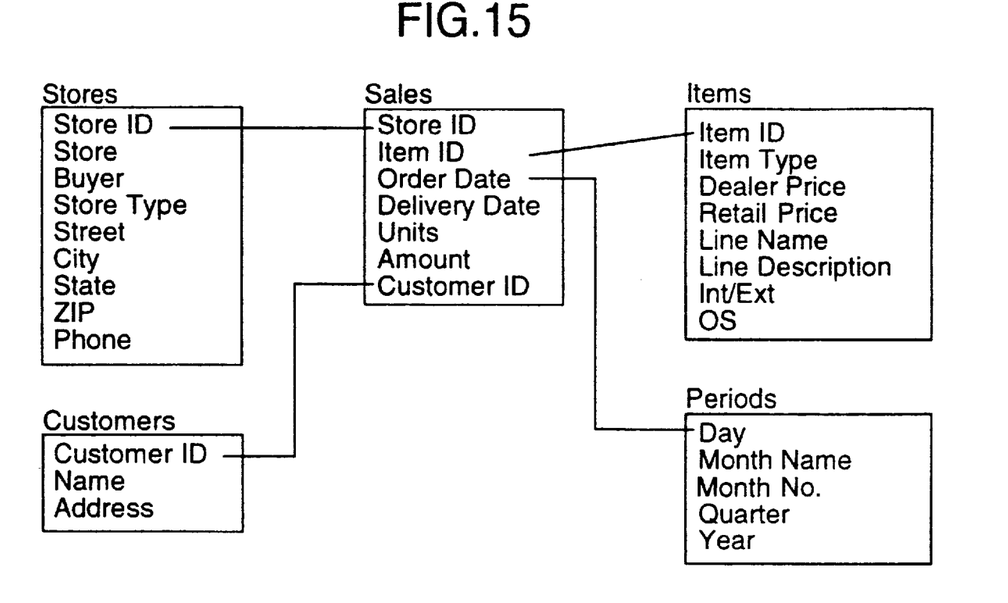
FIG. 15 is a view showing, by way of example, a schema of storage of raw data in a relational database.
Figure 16:
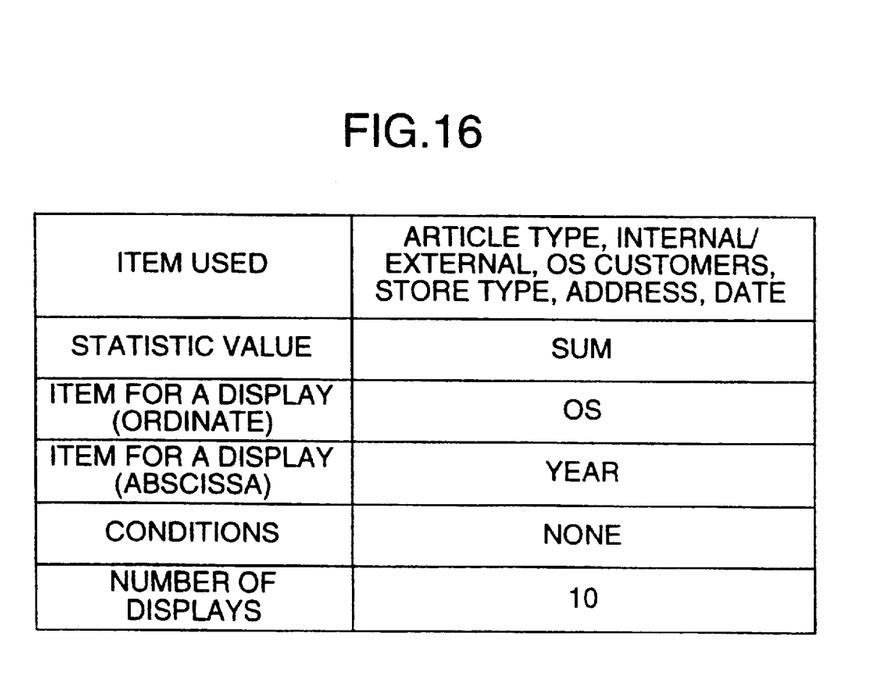
FIG. 16 is a view showing, by way of example, statistic table list generating method specifying parameters used in the system according to the invention.
Figure 17:
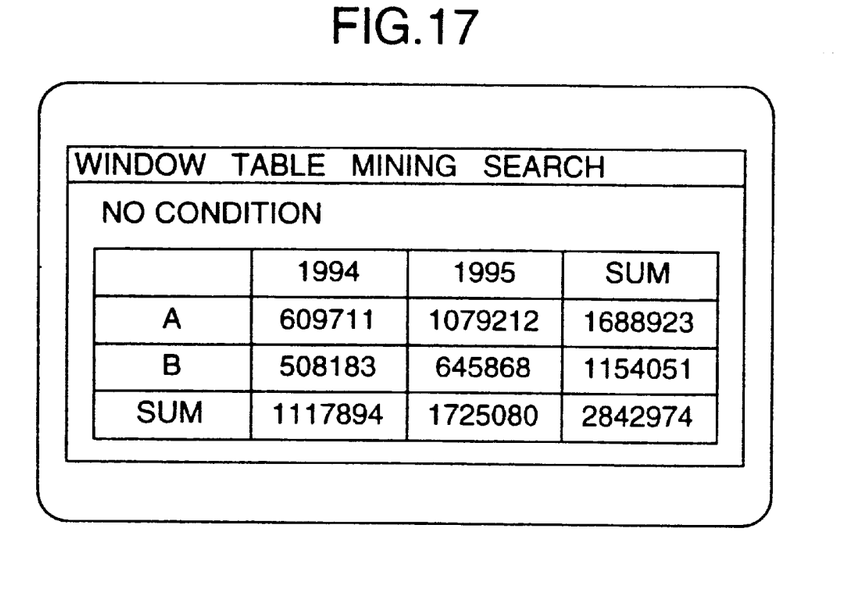
FIG. 17 is a conceptual diagram showing a configuration of a multidimensional database in the system according to the invention.
Figure 18:
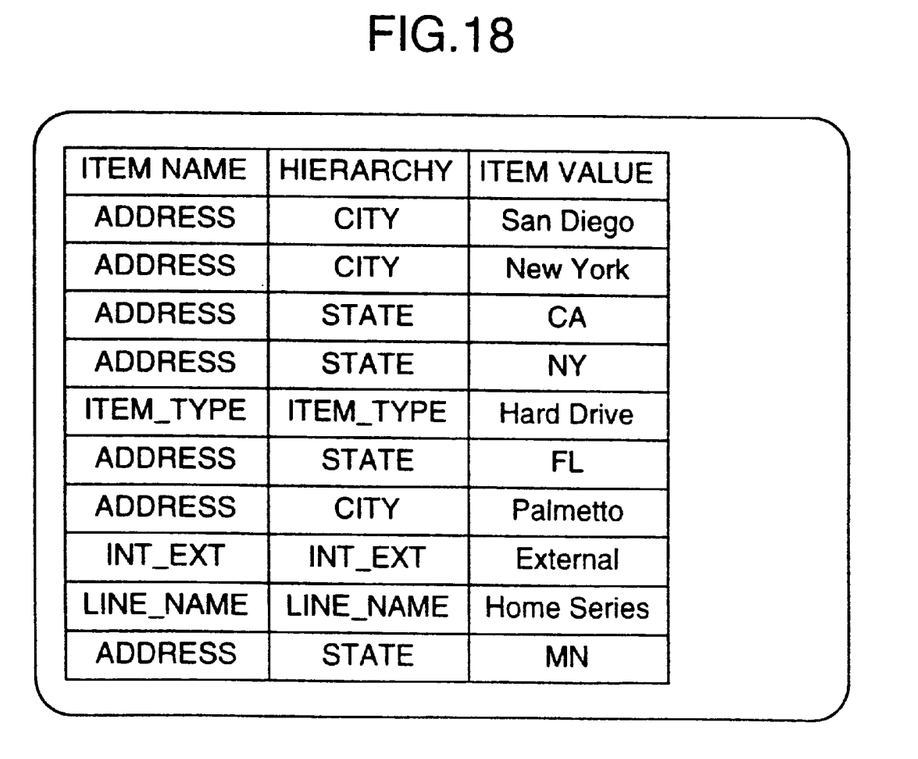
FIG. 18 is a view showing, by way of example, a statistic table list generated in the system according to the invention.
Figure 19:
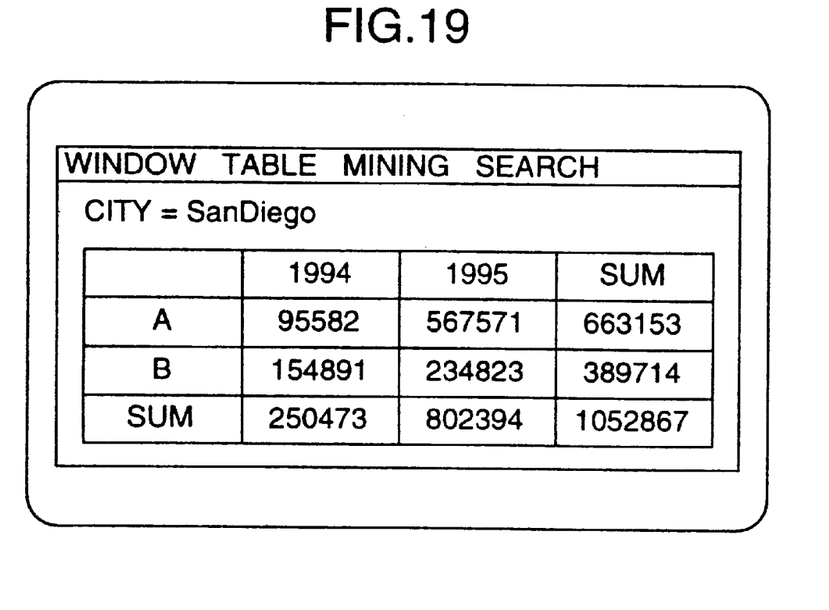
FIG. 19 is a view showing, by way of example, a statistic table generated in the system according to the invention.
Figure 20:
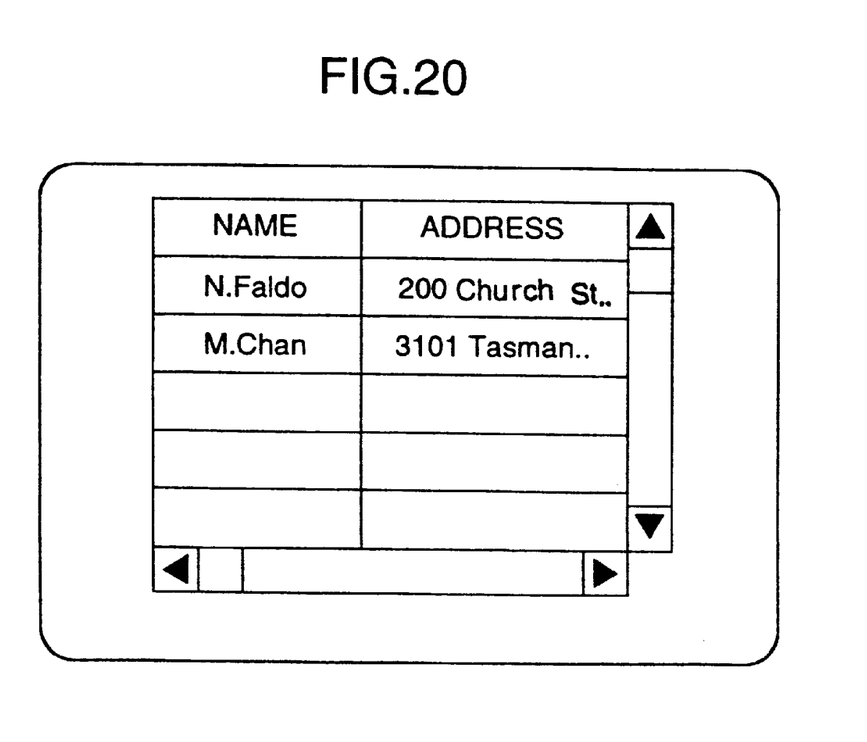
FIG. 20 is a view showing, by way of example, a characteristic record list generated in the system according to the invention.

FIG. 15 shows a schema of storage of raw data 101 in the relational database. Relevant examples of the statistic table list generating method specifying parameters 103 are shown in FIG. 16. In that case, the multidimensional database is displayed on the display of a computer in such a form as that illustrated in FIG. 17. In the displayed data shown in FIG. 17, when a user selects a mining menu, e.g. by clicking "MINING" with an input device such as a mouse, the statistic table list generating unit 102 is activated, whereby a list of statistic tables is displayed on the same screen of the computer in such a form as shown in FIG. 18 on the condition that the data is of hierarchical structure. In the statistic table list shown in FIG. 18, suppose by way of example that a second row is selected. Then, the statistic table such as that shown in FIG. 19 is generated on the display of the computer. Further, assume that the cell in the second column "1994" and the second row "A" is selected, with "SEARCH" in the menu selected. In that case, the record list generating unit 105 is activated, whereby a characteristic record list shown in FIG. 20 is displayed.

Additionally, in accordance with the user's command, the statistic table list generating unit 102 may be automatically activated at the time point when the statistic table is displayed. In that case, by making a relevant list icon to flash, change color, or change the size for attracting the user's attention upon generation of the statistic table list, then the statistic table list such as that shown in FIG. 18 can be displayed on the display screen. Further, progress of the statistic table list generation processing may be indicated by changing the rate at which the icon flashes or changes the color or the size thereof.

Figure 21:
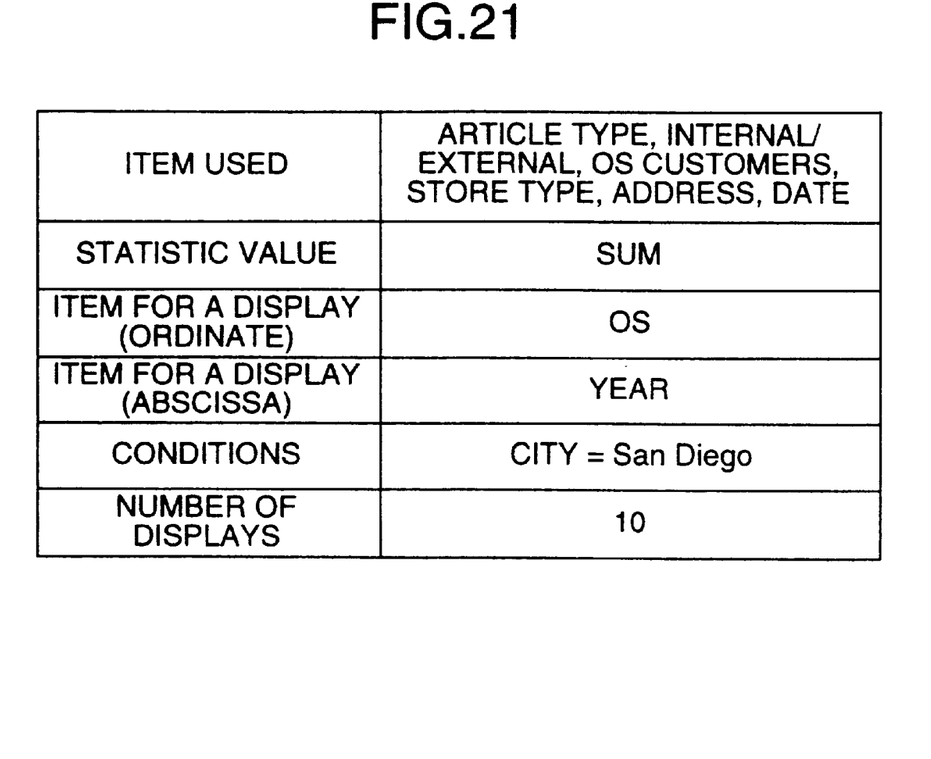
FIG. 21 is a view showing, by way of example, a statistic table list generating method specifying parameters employed in the system according to the invention.
Figure 22:
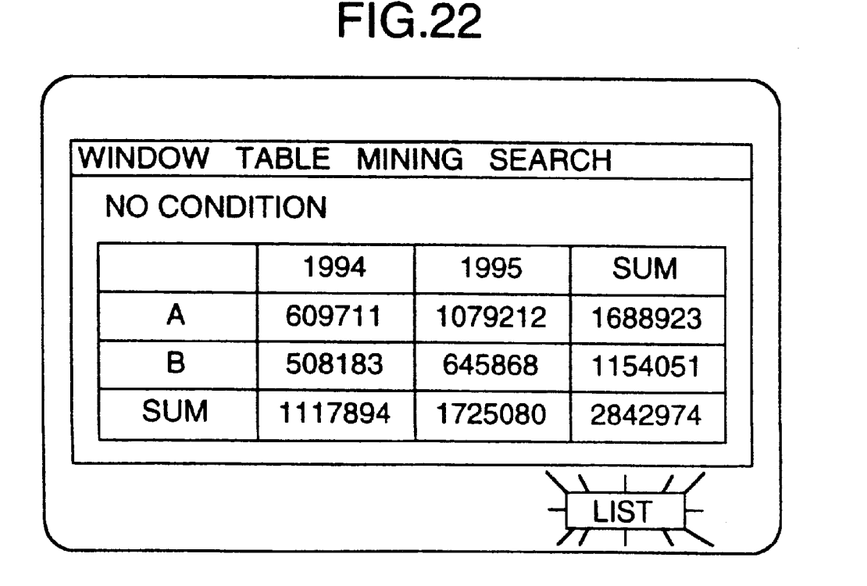
FIG. 22 is a view showing, by way of example, an icon indicating progress in the statistic table list generation processing.

The statistic table list generating unit 102 may be activated repetitively many times as described. By way of example, when the menu item "MINING" is selected again in the statistic table shown in FIG. 19, the statistic table list generating method specifying parameters 103 are rewritten, as illustrated in FIG. 21, whereon the statistic table list generating unit 102 is again activated. A difference between the statistic table list generating method specifying parameters 103 shown in FIG. 16 and FIG. 21, respectively, is seen in that the condition item is "none" in the statistic table list generating method specifying parameters shown in FIG. 16, whereas in the statistic table list generating method specifying parameters shown in FIG. 21, the condition is that "CITY=San Diego".

As is apparent from the foregoing, according to the teachings of the present invention, the statistic tables for component data for which one or more item values are determined definitely can be automatically created or generated to allow the characteristics of these statistic tables to be evaluated. Thus, the statistic tables having the characteristic distributions can be automatically extracted. In addition, by selecting one or more cells after having confirmed the characteristics of the data in the statistic tables, the data contained in the cell or cells can be extracted.

Many modifications and variations of the present invention are possible in the light of the above techniques. It is therefore to be understood that within the scope of the appended claims, the invention may be practiced otherwise than as specifically described.

We claim:

1. A data utilizing system for extracting, from data constituted by a set of records each composed of at least two item values each containing at least one numeric item value, a part of records constituting a part of said data, comprising:

statistic table list generating means for generating, from said data, statistic tables of component data for which at least one item value is definitely specified, and for determining arithmetically characteristic quantities for the statistic tables, respectively, on the basis of differences between said statistic tables generated by said specified item value and relevant expected value distribution tables generated in response to said specified item value, to thereby generate a list of the statistic tables on the basis of said characteristic quantities; and record list generating means for generating from said data a list of records contained in all or at least one specified cell of a specified one of said statistic tables.

2. A data utilizing system according to claim 1, said data being stored in a multidimensional database, wherein said statistic table list generating means arithmetically determines said characteristic quantities on the basis of said multidimensional database.

3. A data utilizing system according to claim 2, wherein said record list generating means includes:

cell-of-interest selecting means for outputting selected cell information containing information concerning the statistic table and a cell or cells specified by user from said statistic table list on the basis of record list generating method specifying parameters specifying information of the statistic table and cell or cells selected by the user's specification, storage type of concerned raw data destined for search, an item name of the record list, and a number of records; and record extracting means for generating a record list from said raw data with the aid of the information concerning said specified cell or cells.

4. A data utilizing system according to claim 2, wherein said statistic table list extracting means includes:

standard statistic table generation processing means for generating a standard statistic table which provides a standard for the arithmetic determination of said characteristic quantities;

item selection processing means for selecting newly a single given item for limiting the record;

item value selection processing means for selecting a single given item value for the item selected by said item selection processing means;

statistic table generation processing means for generating statistic tables whenever the item value selected by said item value selection processing means is added as a new condition;

expected value statistic table generation processing means for generating statistic tables of the expected values whenever the item value selected by said item value selection processing means is added as said new condition;

characteristic quantity arithmetic processing means for evaluating differences between said statistic tables and said expected value statistic tables; and statistic table sort processing means for sorting the statistic tables on the basis of said characteristic quantities arithmetically determined by said characteristic quantity arithmetic processing means.

5. A data utilizing system according to claim 4, wherein said characteristic quantity arithmetic processing means determines said characteristic quantities by dividing difference values between individual cells of said statistic tables and said expected value statistic tables by values contained in same cells of said expected value statistic tables, respectively, and summing squared values of quotients resulting from said division.

6. A data utilizing system according to claim 2, wherein said statistic table list extracting means outputs as a new limitation to be added to said statistic table a list of records, each containing a combination of an item name and an item value or alternatively a combination of an item name, a hierarchical name of the item and an item value.

7. A data utilizing system according to claim 3, wherein said cell-of-interest selecting means transforms information concerning the statistic tables and the cells specified by said record list generating method specifying parameter means into a form which enables searching of data of type specified by the storage type of said raw data.

8. A data utilizing system according to claim 1, wherein specification of one of said statistic tables is realized by selecting one of the statistic table lists displayed on a display screen of a computer by clicking once or alternatively twice one of said statistic table lists, whereby the selected statistic table is displayed on said display screen of the computer.

* * * * *